United States Patent
Lamere et al.

(10) Patent No.: US 12,231,708 B2
(45) Date of Patent: Feb. 18, 2025

(54) SYSTEMS AND METHODS FOR SEQUENCING A PLAYLIST OF MEDIA ITEMS

(71) Applicant: Spotify AB, Stockholm (SE)

(72) Inventors: Paul Lamere, Cape Elizabeth, ME (US); Christopher James Ciollaro, Boston, MA (US); Chang Min Jeon, Portland, OR (US); Peter Martin Deglopper, Somerville, MA (US); James Faulkner Kirk, Somerville, MA (US); Adam Latour Piel, Somerville, MA (US)

(73) Assignee: Spotify AB, Stockholm (SE)

( * ) Notice: Subject to any disclaimer, the term of this patent is extended or adjusted under 35 U.S.C. 154(b) by 135 days.

(21) Appl. No.: 17/499,715

(22) Filed: Oct. 12, 2021

(65) Prior Publication Data

US 2023/0111456 A1 Apr. 13, 2023

(51) Int. Cl.
| | |
|---|---|
| *H04N 21/262* | (2011.01) |
| *H04N 21/239* | (2011.01) |
| *H04N 21/454* | (2011.01) |

(52) U.S. Cl.
CPC ... *H04N 21/26258* (2013.01); *H04N 21/2393* (2013.01); *H04N 21/454* (2013.01)

(58) Field of Classification Search
CPC ......... H04N 21/26258; H04N 21/2393; H04N 21/454; H04N 21/4825
USPC ....................................................... 725/116
See application file for complete search history.

(56) References Cited

U.S. PATENT DOCUMENTS

| | | | |
|---|---|---|---|
| 10,276,170 B2 * | 4/2019 | Gruber | G06F 3/167 |
| 2008/0021577 A1 | 1/2008 | Ijichi et al. | |
| 2008/0208775 A1 | 8/2008 | Vossen et al. | |
| 2009/0222392 A1 * | 9/2009 | Martin | G06F 16/437 |
| | | | 707/999.005 |
| 2012/0123998 A1 | 5/2012 | Heller et al. | |
| 2014/0074959 A1 | 3/2014 | Alsina et al. | |
| 2014/0114985 A1 * | 4/2014 | Mok | G06Q 30/0271 |
| | | | 707/748 |

(Continued)

OTHER PUBLICATIONS iTunes User Guide, Create a Smart Playlist in iTunes on Mac, Apple Support, macOS. mOJAVE 10.14, Apr. 26, 2021, from https://support.apple.com/en-in/guide/itunes/itns3001/mac, 2 pgs.

*Primary Examiner* — Alfonso Castro
(74) *Attorney, Agent, or Firm* — Morgan, Lewis & Bockius LLP

(57) ABSTRACT

A server system receives a request to generate a playlist. The playlist includes a sequence of media items. The server system receives a plurality of constraints that define disqualification criteria for excluding media items from a respective slot in the sequence of media items. The plurality of constraints for the respective slot in the sequence of media items includes at least one constraint that is based on already-populated slots in the sequence of media items. The server system generates the playlist by sequentially populating each respective slot in the sequence of media items, including selecting, for the respective slot, a respective media item that meets the plurality of constraints for the respective slot in the sequence of media items. The server system provides the playlist to a user of the media providing service.

20 Claims, 11 Drawing Sheets

(56) References Cited

U.S. PATENT DOCUMENTS

| | | | |
|---|---|---|---|
| 2014/0280181 A1* | 9/2014 | Rodger | G06F 16/4387 |
| | | | 707/740 |
| 2015/0356447 A1* | 12/2015 | Lowe | G06F 16/638 |
| | | | 706/47 |
| 2018/0189020 A1* | 7/2018 | Oskarsson | G06F 16/686 |
| 2018/0189306 A1* | 7/2018 | Lamere | G06F 16/90324 |
| 2020/0278997 A1* | 9/2020 | Lamere | G06F 16/632 |

\* cited by examiner

The larger set of constraints includes multiple constraints that are independent of the already-populated slots in the sequence of media items.

Prior to generating the playlist by sequentially populating each respective slot in the sequence of media items, generate a table that includes information indicating the priority at which each of the plurality of candidate media items is disqualified from each respective slot in the sequence of media items.

Relaxing, based on the respective priorities, the larger set of constraints to produce the plurality of constraints that is the subset, less than all, of the larger set of constraints includes referring to the table.

FIG. 7C

SYSTEMS AND METHODS FOR SEQUENCING A PLAYLIST OF MEDIA ITEMS

TECHNICAL FIELD

The disclosed embodiments relate generally to media playback, and, in particular, to generating playlists of media items (e.g., personalized playlists).

BACKGROUND

Access to electronic media, such as music and video content, has expanded dramatically over time. As a departure from physical media, media content providers stream media to electronic devices across wireless networks, improving the convenience with which users can digest and experience such content.

Media content providers often provide automatically generated playlists to users, which may also include, for example, streaming music "stations" based on particular songs, artists, genres or topics.

SUMMARY

The present disclosure recognizes that, when generating playlists (e.g., automatically, by a computer system, generating playlists of suggested media content), it may be beneficial to apply constraints. For example, such constraints may specify that the same song should not play twice in a row, nor should songs from the same artist. The conventional approach to applying these constraints is to do so after populating a playlist. Under this approach, the entire playlist is populated, and then the constraints are applied one after another. The problem with this approach is that the last-to-be-applied constraints receive "favoritism": these constraints are more rigidly met in the resulting playlist than earlier-applied constraints.

To solve this problem, the disclosed embodiments apply the constraints while populating each respective slot in a playlist. For example, a first song (or other media item) is assigned to the first slot in the playlist. A second song is selected for the second slot from a pool of candidate songs such that all of the constraints are met for the second song being placed in the second slot, given what is already in the first slot. The third song is selected such that all of the constraints are met for the third slot, given what is already in the first and second slots, and so on. Thus, the disclosed embodiments generate the playlist by sequentially populating each respective slot in the sequence by selecting, for the respective slot, a respective media item that meets the plurality of constraints for the respective slot. In some embodiments, at least some of the constraints are based on a state of the playlist to that point. In other words, the constraints for slot three may depend on what is already in slots one and two.

To that end, in accordance with some embodiments, a method is performed at a server system associated with a media providing service. The server system includes one or more processors and memory storing one or more programs. The one or more programs include instructions executable by the one or more processors. The method includes receiving a request to generate a playlist. The playlist includes a sequence of media items. The method includes receiving a plurality of constraints that define disqualification criteria for excluding media items from a respective slot in the sequence of media items. The plurality of constraints for the respective slot in the sequence of media items includes at least one constraint that is based on already-populated slots in the sequence of media items. The method includes generating the playlist by sequentially populating each respective slot in the sequence of media items, including selecting, for the respective slot, a respective media item that meets the plurality of constraints for the respective slot in the sequence of media items. The method includes providing the playlist to a user of the media providing service.

In accordance with some embodiments, a server system associated with a media providing service includes one or more processors and memory. The memory stores one or more programs including instructions for receiving a request to generate a playlist. The playlist includes a sequence of media items. The one or more programs further include instructions for receiving a plurality of constraints that define disqualification criteria for excluding media items from a respective slot in the sequence of media items. The plurality of constraints for the respective slot in the sequence of media items includes at least one constraint that is based on already-populated slots in the sequence of media items. The one or more programs further include instructions for generating the playlist by sequentially populating each respective slot in the sequence of media items, including selecting, for the respective slot, a respective media item that meets the plurality of constraints for the respective slot in the sequence of media items. The one or more programs further include instructions for providing the playlist to a user of the media providing service.

In accordance with some embodiments, a computer-program product (e.g., a non-transitory computer-readable storage medium) includes instructions, which, when executed by a server system associated with a media providing service, cause the server system to perform a set of operations. The set of operations includes receiving a request to generate a playlist. The playlist includes a sequence of media items. The set of operations includes receiving a plurality of constraints that define disqualification criteria for excluding media items from a respective slot in the sequence of media items. The plurality of constraints for the respective slot in the sequence of media items includes at least one constraint that is based on already-populated slots in the sequence of media items. The set of operations includes generating the playlist by sequentially populating each respective slot in the sequence of media items, including selecting, for the respective slot, a respective media item that meets the plurality of constraints for the respective slot in the sequence of media items. The set of operations includes providing the playlist to a user of the media providing service.

Thus, systems are provided with improved methods for generating playlists that are subject to constraints.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 7A-7C are flow diagrams illustrating a method of sequencing a playlist of media items, in accordance with some embodiments.

DETAILED DESCRIPTION

Figure 1:
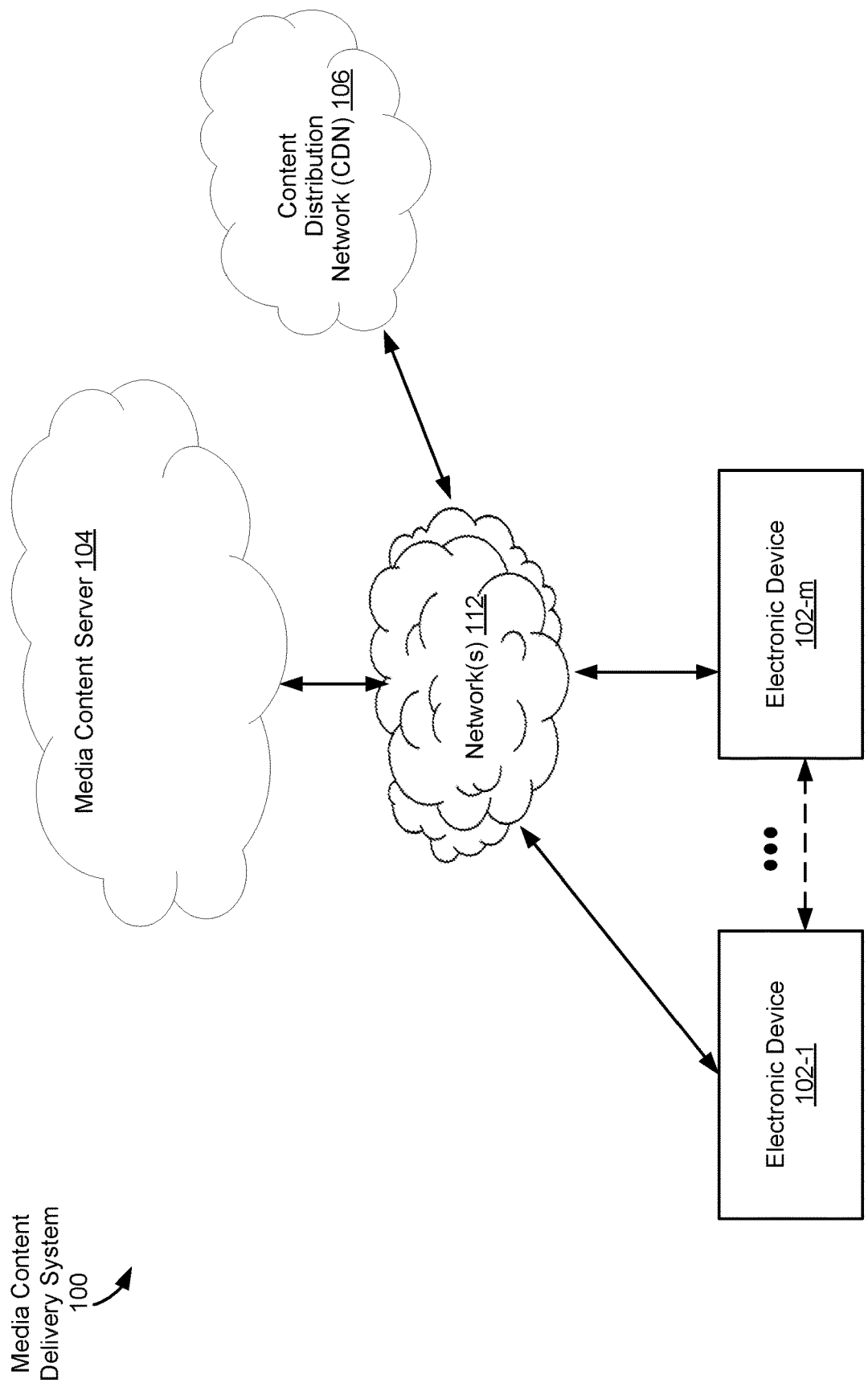
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "playlist" means a list of digital files to be played on an electronic device (e.g., an electronic device 102). In some embodiments, the playlists described herein are generated automatically (e.g., algorithmically) by a computer system (e.g., the playlists comprise suggested media content). In some embodiments, the playlists described herein include so-called "radio stations" (e.g., streaming music "stations" based on particular songs, artists, genres, or topics). In some embodiments, the playlist described herein include personalized playlists (e.g., playlist based on preferences of the user to whom the playlist is being provided). An example of a personalized playlist is a "Daily Mix," which recommends media items that a user is likely to enjoy. In some embodiments, the personalized playlists are based on a listening history of the user with a streaming media service (e.g., the streaming media service providing the playlist). One of skill in the art, having the benefit of this disclosure, will recognize numerous other types of playlists to which the embodiments described herein may apply.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, infotainment system, digital media player, a speaker, television (TV), digital versatile disk (DVD) player, and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and **102-*m*, in some embodiments, also send indications of media content items to media content server 104 through network(s) 112. In some embodiments, the media content items are uploaded to electronic devices 102-1 and 102-*m* before the electronic devices forward the media content items to media content server 104**.

In some embodiments, electronic device 102-1 communicates directly with electronic device **102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m***.

In some embodiments, electronic device 102-1 and/or electronic device **102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, podcasts, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102**.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service (e.g., key database 336, FIG. 3). In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user, defined by an editor associated with a media providing service, defined by an algorithmic model, or defined through any other means (or combination of means). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
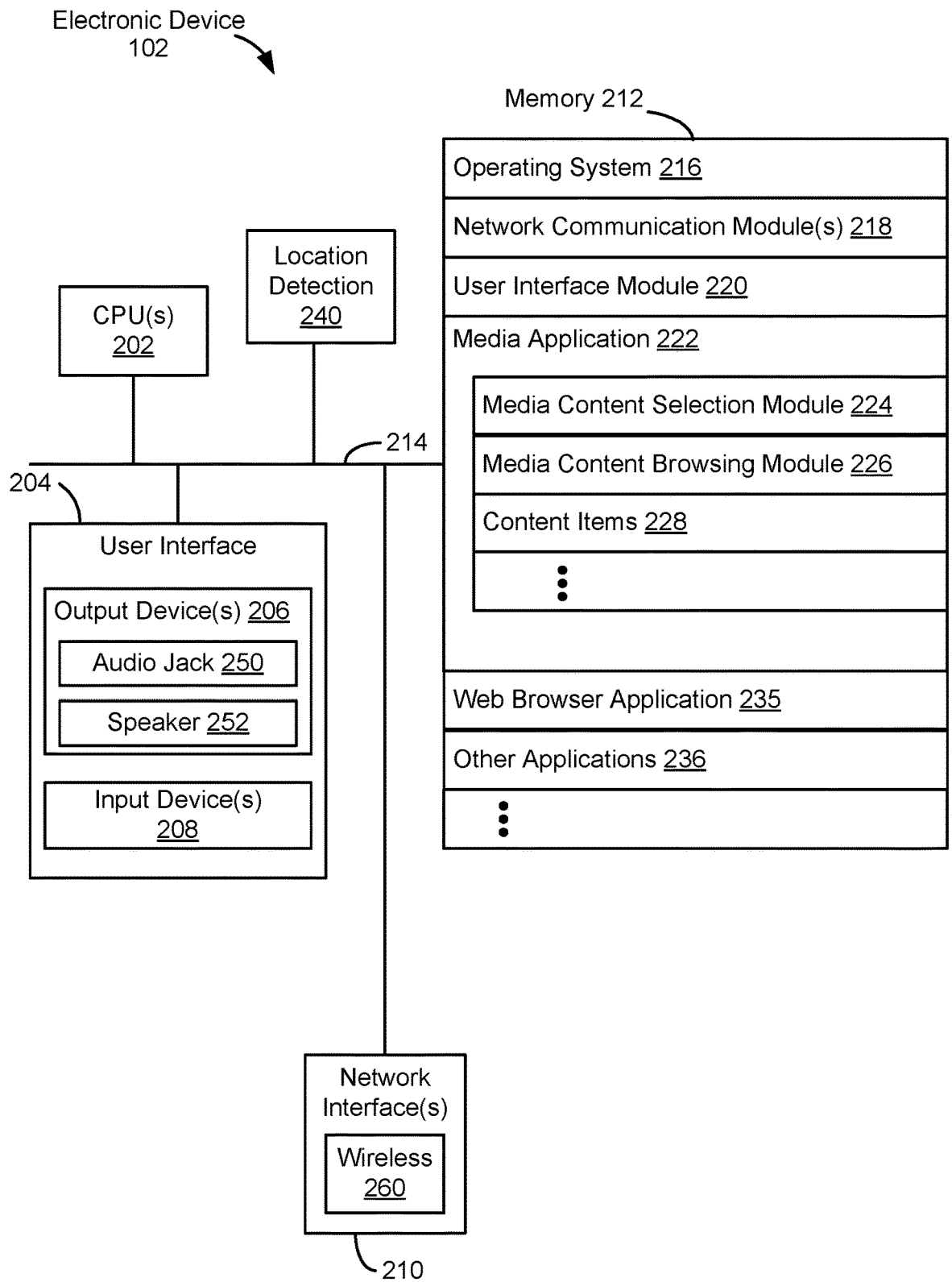
FIG. 2 is a block diagram illustrating a client device, in accordance with some embodiments.

FIG. 2 is a block diagram illustrating an electronic device 102 (e.g., electronic device 102-1 and/or electronic device **102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214** optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- media application 222 (e.g., an application for accessing a media providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 also includes the following modules (or sets of instructions), or a subset or superset thereof:
  - a media content selection module 224 for selecting one or more media content items and/or sending, to the media content server, an indication of the selected media content item(s). In some embodiments, a user may select a playlist that is periodically generated or updated (e.g., a "My Daily Hits" playlist that is generated or updated daily, when the user requests the playlist, or otherwise on a predefined schedule);
  - a media content browsing module 226 for providing controls and/or user interfaces enabling a user to navigate, select for playback, and otherwise control or interact with media content, whether the media content is stored or played locally or remotely;
  - a content items module 228 for storing media items for playback and/or for forwarding requests for media content items to the media content server;
- a web browser application 235 (e.g., Internet Explorer or Edge by Microsoft, Firefox by Mozilla, Safari by Apple, or Chrome by Google) for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
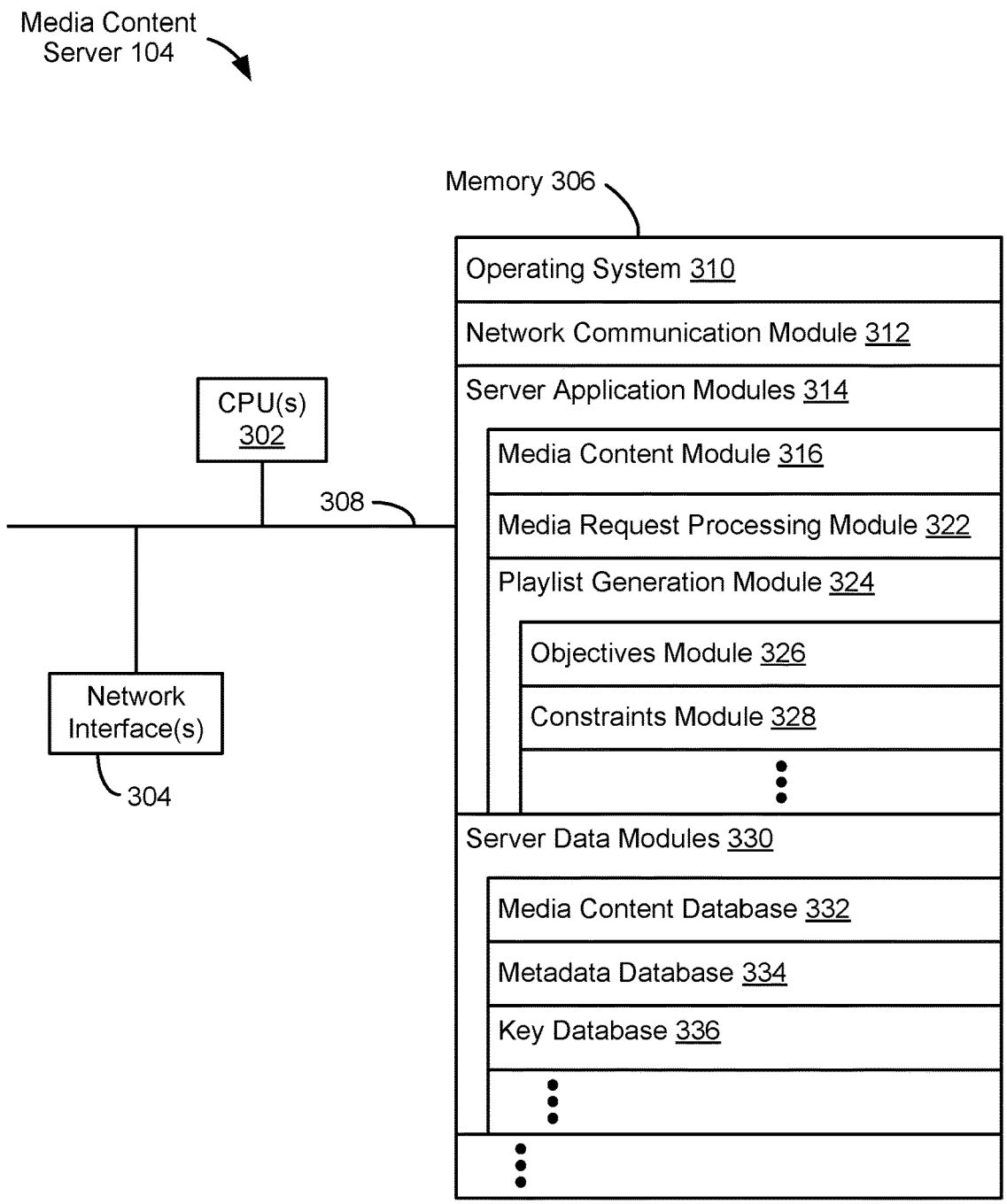
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s), or one or more media content item(s) from a requested playlist;

a media request processing module 322 for processing requests for media content and facilitating access to requested media items by client devices (e.g., the client device 102) including, optionally, streaming media content to such devices and/or to one or more media presentation system(s) 108;

A playlist generation module 324 for selecting a sequence of media items (e.g., for performing method 700, as described with reference to FIGS. 7A-7C). In some embodiments, the playlist generation module 324 includes one or more of:

An objectives module 326 for generating scores for each of a plurality of objectives and aggregating the respective scores; and A constraints module 328 for determining which media items meet a plurality of constraints for generating the sequence of media items. In some embodiments, the constraints define disqualification criteria for excluding media items from a respective slot in the sequence of media items. The constraints may include global constraints (e.g., constraints that do not depend on already-populated slots in the sequence of media items) as well as non-global constraints (e.g., constraints that depend on already-populated slots in the sequence of media items).

one or more server data module(s) 330 for handling the storage of and/or access to media items and/or metadata relating to the media items; in some embodiments, the one or more server data module(s) 330 include:

a media content database 332 for storing media items;

a metadata database 334 for storing metadata relating to the media items; and a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein.

In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
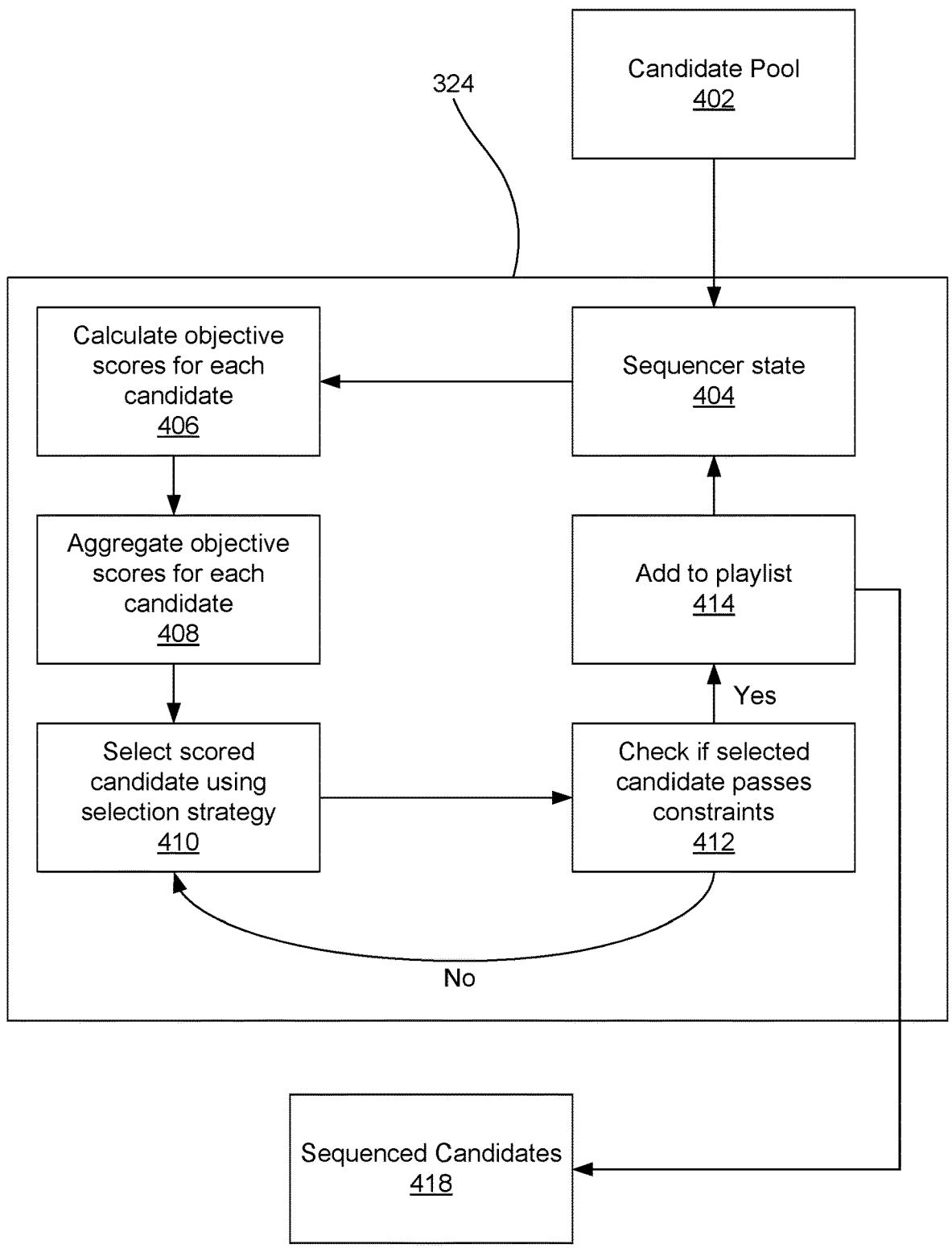
FIG. 4A is a schematic diagram of a process for sequencing a playlist of media items, in accordance with some embodiments.

FIG. 4A is a schematic diagram of a process for sequencing a playlist of media items, in accordance with some embodiments. Playlist generation module 324 (server system 104, FIG. 3) accesses a candidate pool 402. In some embodiments, the candidate pool comprises media content items that are candidates for inclusion into the playlist (referred to hereafter as "candidates"). In some embodiments, the candidate pool comprises a repository of media content items (e.g., several thousand or million media content items). In some embodiments, the media content items comprise audio content items and/or video content items (which would also typically include audio). In some embodiments, the media content items in the candidate pool have already been pre-filtered from a larger set (e.g., repository) of media content items. For example, in some embodiments, the media content items in the candidate pool comprise media content items that have been selected for a specific user (for whom the playlist is being generated). In some embodiments, the media content items have been selected for the specific user based on the specific user's listening history and/or current context (e.g., time of day, location, etc.). In some embodiments, the playlist generation module 324 pulls (e.g., considers) all of the media items in candidate pool 402 to fill a slot in the playlist (e.g., according to the remainder of the process illustrated in FIG. 4A). Alternatively, in some embodiments, the candidate pool includes many thousands or millions of items and the playlist generation module 324 pulls a predefined batch of candidate items (e.g., 100 items selected at random) to fill a slot in the playlist.

The playlist generation module 324 keeps track of a sequencer state 404 that indicates an order of media content items that have already been added to the playlist (e.g., already-populated slots in the sequence of media items). In some embodiments, the set of constraints are varied based on the media content items that have already been added to the playlist (e.g., the constraints are dynamically updated, for each respective slot). At the outset (e.g., when populating slot or index 0), there are no media content items in the playlist (e.g., the sequencer state 404 is null). Thus, the only constraints to be applied to index 0 are global constraints (e.g., constraints that do not depend on already-populated slots in the sequence of media items).

The playlist generation module 324 calculates (e.g., for each candidate) objective scores 406 for each of a plurality of objectives. For example, the objectives may include listener-based objectives (e.g., such as maximizing the number of "likes," maximizing the length of the listening session, minimizing the number of skips, etc.) as well as artist-based objectives (e.g., an objective to promote certain tracks or artists, an objective to provide the user with a greater diversity of music so as to attract the user to new music, etc.). In addition, some objectives may depend on the sequencer state (e.g., by penalizing placement of two songs by the same artist in close proximity to one another).

The playlist generation module 324 aggregates 408 the objective scores for each candidate. In some embodiments, objective scores are aggregated according to an aggregation function. In some embodiments, objective scores are aggregated using a weighted average (e.g., the aggregation function is a weighted average function). In some embodiments, the objective scores are aggregated using an ordered weighted average. In some embodiments, the objective scores are aggregated using a hierarchical ordered weighted average (e.g., as described with reference to FIGS. 5A-5B, below). In any event, the output of the aggregation function is typically a single value representing an overall score for the candidate.

The playlist generation module 324 selects 410 a scored candidate using a selection strategy. For example, in some embodiments, the playlist generation module 324 selects the highest scored candidate (e.g., the candidate item with the highest aggregated score). In some embodiments, the playlist generation module 324 randomly selects a candidate from the candidates with scores above a predefined threshold (e.g., randomly selects one of the top 10 or 100 scored candidates).

The playlist generation module 324 checks if the selected candidate passes constraints 412. In some embodiments, the selected candidate item is checked against a plurality of constraints. The plurality of constraints define disqualification criteria for excluding media items from the respective slot in the sequence of media items. In some embodiments, the plurality of constraints for the respective slot in the sequence of media items includes at least one constraint that is based on already-populated slots in the sequence of media items (e.g., the playlist generation module 324 checks that the selected candidate meets the constraints with respect to the sequencer state 404). For the first item in the playlist (e.g., index 0), such constraints are moot. In accordance with a determination that the selected candidate has passed the constraints, the selected candidate item is added to the playlist 414 and the sequencer state 404 is updated, and the process is repeated for the next slot in the sequence of media items (e.g., using the updated sequencer state). On the other hand, in accordance with a determination that the selected candidate does not pass constraints, a new scored candidate is selected using the selection strategy. The loop of checking if the selected candidate passes constraints 412 and selecting a scored candidate item repeats until a selected candidate item passes the constraints or there are no remaining scored candidate items. In the latter case, in some embodiments, the constraints are relaxed (according to a priority of the constraints) and the loop is repeated. The sequenced candidates (e.g., the playlist) are then provided to the user 418.

Note that FIG. 4A illustrates embodiments in which the candidate items are scored before checking to see which candidate items pass the constraints. In some embodiments, however, the playlist generation module 324 checks which candidates pass the constraints for a respective slot, then scores the candidates and selects a candidate based on a selection strategy.

Figure 4B:
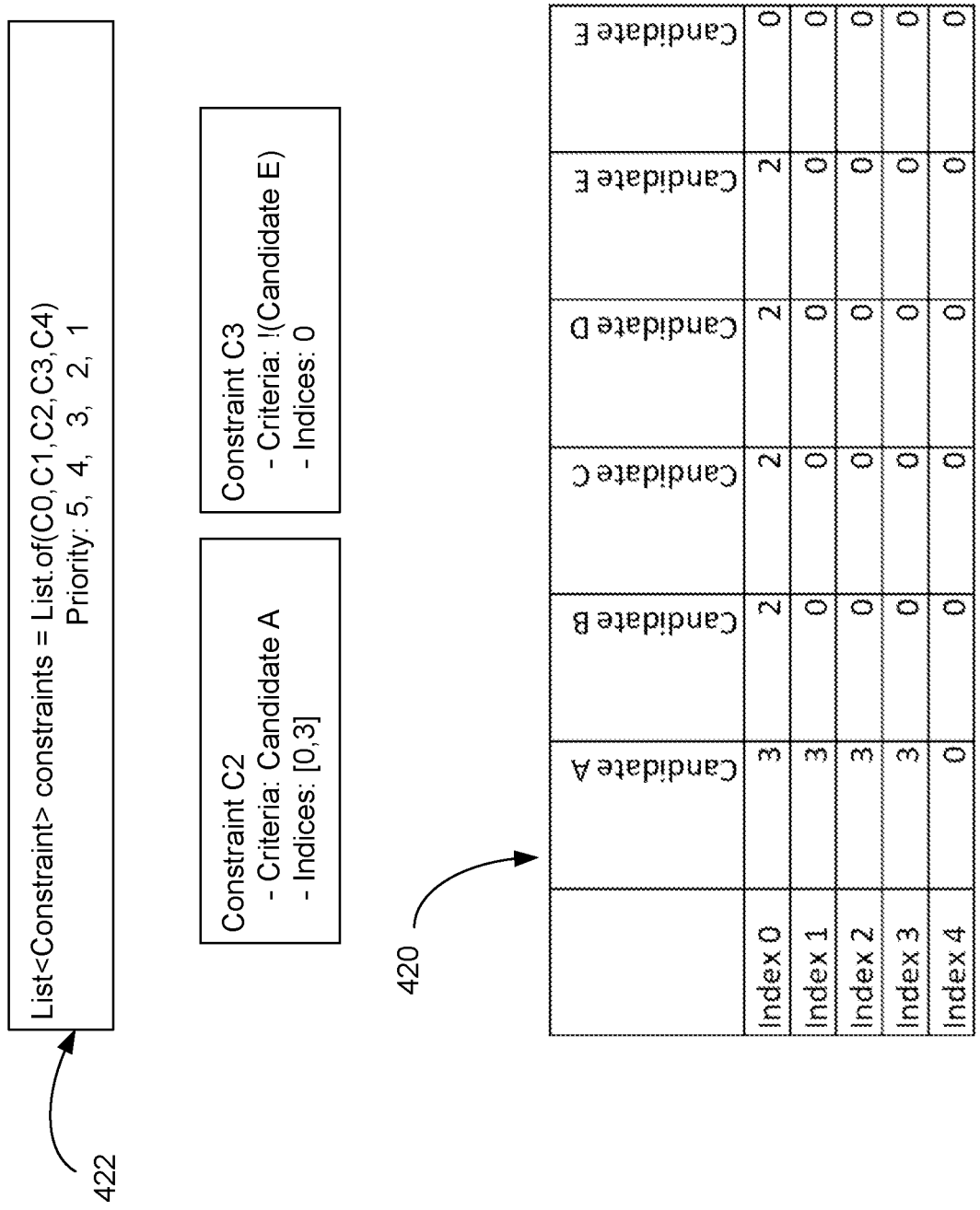
FIG. 4B illustrates a disqualification table for constraints for sequencing a playlist of media items, in accordance with some embodiments.

FIG. 4B illustrates a disqualification table 420 for constraints for sequencing a playlist of media items, in accordance with some embodiments. In some embodiments (e.g., in which the playlist generation module 324 determines which candidates pass which constraints before scoring the candidates), the disqualification table 420 includes all constraints (e.g., global constraints, as well as constraints that depend on the sequencer state 404) and is produced at the beginning of the process for populating each respective slot in the playlist (e.g., the disqualification table 420 is generated or updated once for each slot, before populating the slot). In some embodiments (e.g., in which the playlist generation module 324 scores candidates before determining whether individual candidates pass the constraints for a respective slot), the disqualification table 420 includes only global constraints (e.g., the disqualification table 420 is generated once for populating the entire playlist). In either event, the disqualification table 420 makes the process of determining whether particular candidates meet the constraints more efficient, without needing to constantly recheck the candidates (e.g., when relaxing constraints).

The constraints (e.g., constraints C0, C1, C2, C3, and C4) are specified by a list of constraints 422, which also specifies a priority of the constraints (e.g., based on an order in which the constraints are passed as arguments). In the example shown in FIG. 4B, C0 is the highest priority constraint (with a priority of 5), C1 is the second highest priority constraint (with a priority of 4), C2 is the third highest priority constraint (with a priority of 3), C3 is the fourth highest priority constraint (with a priority of 2) and C4 is the lowest priority constraint (with a priority of 1).

Two examples of constraints are shown in FIG. 4B. Constraint C2 disqualifies candidate A from indices 0 through 3 (in other words, disqualifies candidate A from the first four positions in the playlist). Constraint C3 disqualifies all candidates other than candidate E from index zero. Such a constraint may be appropriate, for example, when the playlist is a "radio station" for a particular song, and candidate E is the particular song (e.g., it is often desirable to start a particular song's "radio station" with that song).

Disqualification table 420 includes columns corresponding to individual candidates and rows corresponding to indices within the sequence of media items (e.g., slots in the playlist). Disqualification table 420 indicates the highest priority at which each candidate is disqualified. For example, candidate A is disqualified from index 0 by both constraint C2 and constraint C3. But because constraint C2 has a higher priority (e.g., a priority of 3 as opposed to a priority of 2), the disqualification table 420 includes a value of 3 for candidate A at index 0. A value of 0 in disqualification table 420 indicates that the candidate is not disqualified by any of the constraints. As constraints are relaxed to a certain level of priority, the playlist generation module 324 references the disqualification table to determine which candidates pass the constraints at that level of priority.

In some embodiments, the disqualification table 420 is calculated for the candidates in the candidate pool 402 (FIG. 4A). In some embodiments, the disqualification table 420 is calculated for each candidate in the candidate pool 402 (e.g., disqualification table 420 includes a column for each candidate in the candidate pool 402).

Figure 5A:
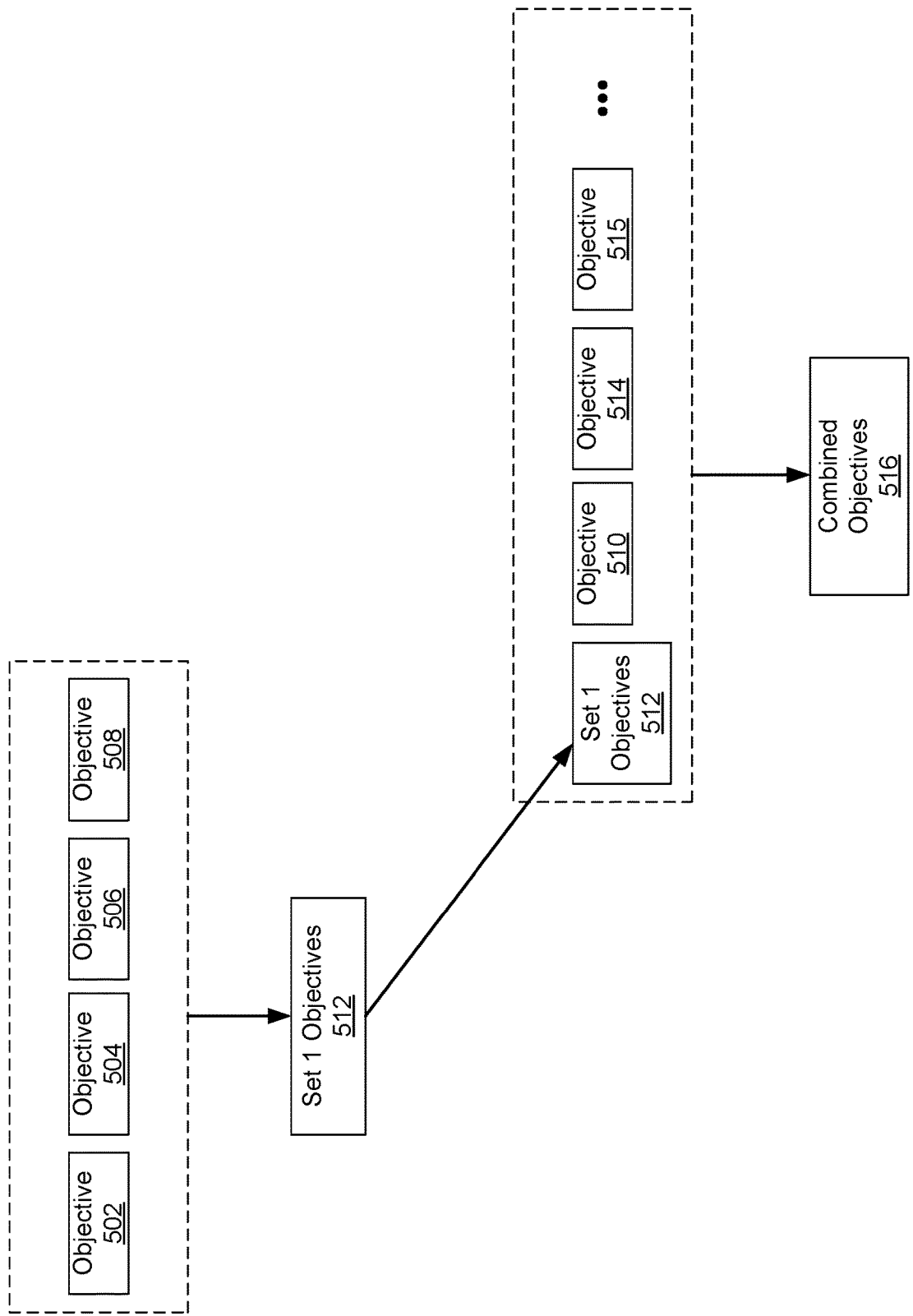
FIGS. 5A-5B illustrate block diagrams of processes of combining multiple objectives using hierarchical ordered weighted averaging, in accordance with some embodiments.
Figure 5B:
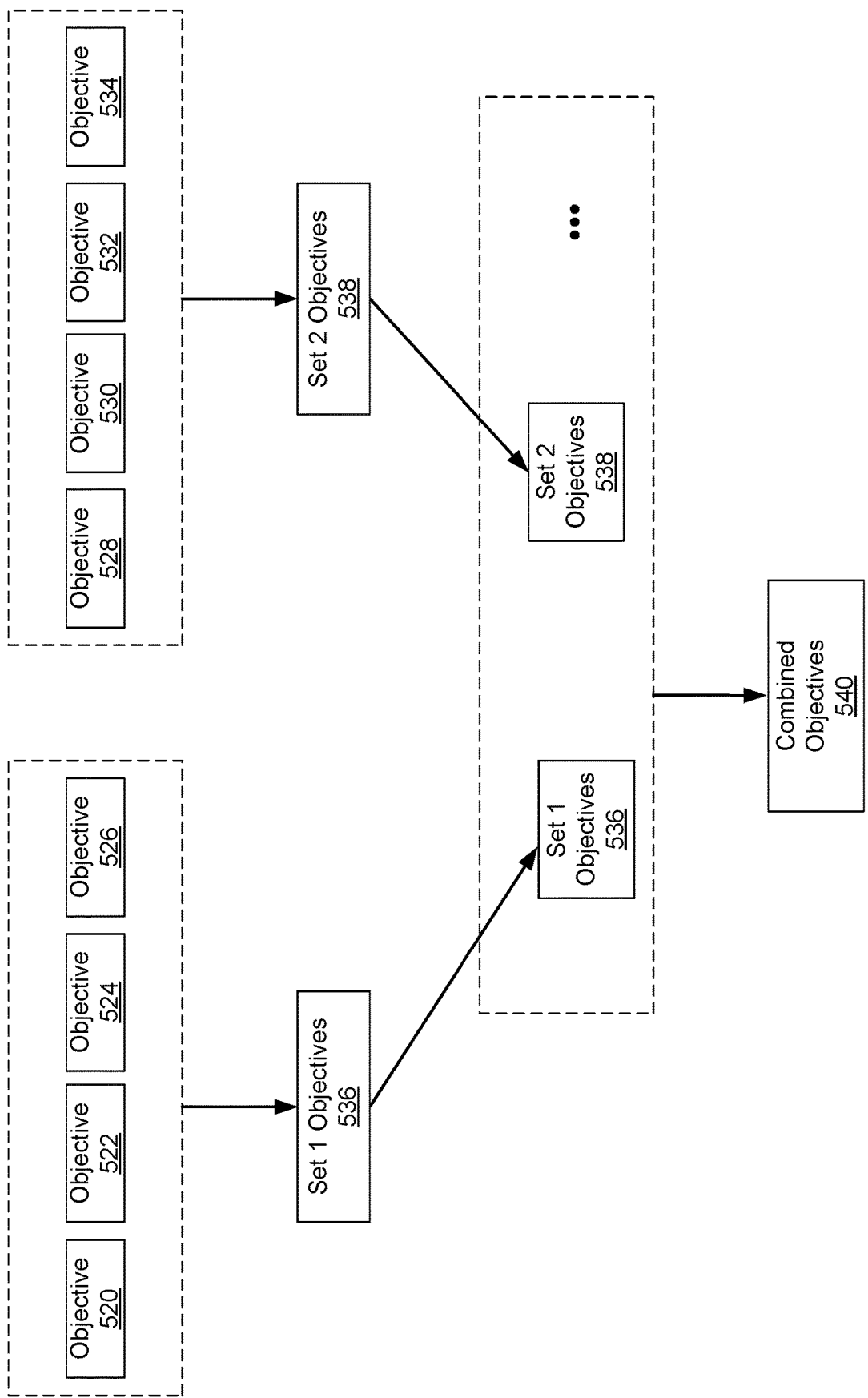

FIGS. 5A-5B illustrate a block diagram of a process of combining multiple objectives using hierarchical ordered weighted averaging, in accordance with some embodiments. In order to determine an overall score for a particular media content item (referred to below as a candidate, x), as a candidate to include in a playlist, its scores for various objectives are aggregated using an ordered weighted average. Ordered weighted average functions (OWA functions) are aggregation functions that associate weights with the value of each input (instead of associating weights with a particular input). In this way, OWA functions differ from weighted arithmetic means in that the weights for OWA functions are not apriori associated with the particular inputs, but are associated with particular inputs based on the relative magnitude of the inputs (e.g., a first weight is applied to the highest-valued input, a second weight is applied to the second highest-valued input, and so on). Thus, the importance of an input is determined by its value. For example, when selecting candidates using several satisfaction criterion (e.g., relevance, popularity, artist affinity), the largest input (the highest satisfaction criterion) is the most important, regardless of whichever specific one it is. The procedure involves three main steps: (i) specifying a quantifier, Q, (ii) generating a set of order weights associated with Q, and (iii) computing the overall evaluation for each candidate (e.g., where, in some embodiments, each candidate is a media content item that could be included in a playlist) by means of the OWA combination function. Given a weighting vector w, the OWA function is:

$$OWA_w(x) = \sum_{i=1}^{n} w_i x_{(i)} = \langle w, x_\searrow \rangle,$$

where w is the weighting vector, x is the input vector, and $x_\searrow$ is the vector obtained from x by arranging its components in non-increasing order (e.g., from the greatest value of x to the least value of x). Note that calculation of the value of the OWA function can be done by using a sort( ) operation. If all weights are equal, OWA becomes an arithmetic mean.

OWA functions are symmetric aggregation functions that allocate weights according to the input value. Thus, OWA can emphasize the largest, the smallest or mid-range inputs (in other words, the weight applied to the highest value need not be the largest weight). Thus, in the OWA aggregation, the weights are not associated with a particular argument but with the ordered position of the arguments. The quantifier is used to generate an OWA weighting vector W of dimension n (e.g., where n is the number of inputs to be weighted). This weighting vector is then used in an OWA aggregation to determine the overall evaluation for each candidate. For each candidate, the argument of this OWA aggregation is the satisfaction of the candidate to each of the criteria (e.g., where the satisfaction of the candidate to each of the criteria is the score for each objective, as discussed elsewhere in this document).

In some embodiments, the quantifier is a Regular Increasing Monotone (RIM) quantifier, which implies that the solution improves as more criteria are satisfied:

$$w_i = Q\left(\frac{i}{n}\right) - Q\left(\frac{i-1}{n}\right).$$

The Regular Increasing Monotone (RIM) quantifier can provide information aggregation procedures guided by verbally expressed concepts (e.g., linguistic quantifiers, that are able to express the concept of fuzzy majority: "for all", "there exists", "identity", "most", "at least half", "as many as possible") and a dimension independent description of the desired aggregation. A fuzzy subset Q of the real line is called a Regular Increasing Monotone (RIM) quantifier if $Q(0)=0$, $Q(1)=1$ and $Q(x) \geq Q(y)$ if $x > y$.

Some parameterized RIM quantifier families $Q(x, \alpha)$ are discussed where parameter $\alpha$ determines the "or"-ness level of these quantifiers, which serves as the control parameter in the aggregation process. Although the class of proportional quantifiers known as the regular increasing monotone (RIM) quantifiers is described here, it will be understood that other types of quantifiers can also be used. To identify the quantifier some embodiments employ a method for defining a parameterized subset on the unit interval. For example, $$Q(p)=p^\alpha (\alpha>0)$$

where Q(p) is represented as a fuzzy set in interval [0, 1]. It can be applied for generating a whole family of the RIM quantifiers. By changing the parameter, $\alpha$, one can generate different types of quantifiers and associated operators between the two extreme cases of the all and at least one quantifiers. For $\alpha=1$, Q(p) is proportional to $\alpha$ and therefore it is referred to as the identity quantifier. As $\alpha$ tends to zero, the quantifier Q(p) approaches its extreme case of at least one, which corresponds to the MAX operator. As $\alpha$ tends to infinity, the quantifier Q(p) approaches its extreme case of all, which corresponds to the MIN operator. The OWA operator can be used in multiple levels, so as to form a hierarchical ordering across multiple objectives.

Depending on the value of $\alpha$, OWA can give high weights to (i) sets of objectives that have many high objective scores (OWA_MANY), which works like an "AND" operator, or (ii) sets of objectives that have any high objective scores (OWA_ANY), which works like an "OR" operator, or anything in between (depending on the value of alpha). For example, for a low value of alpha (e.g., OWA_ANY), a high weight is given to the entire set of objectives if at least one of the objective scores is high. In another example, for a high value of alpha, the OWA calculation acts like an "AND" operator, where the set of objectives is assigned a high weight value only when many of the objective scores are high.

Hierarchical Ordered Weighted Average (HOWA) is an expansion of OWA. Objectives are grouped into different Objective Sets and the weight outputs from OWA calculations (either OWA_MANY, or OWA_ANY) are used as inputs to another OWA calculation. In some embodiments, the Objective Sets are treated as individual objectives. For example, OWA outputs are recursively used as new OWA inputs. The "hierarchical" part of HOWA is where the output of different OWA results are then used as the input to another OWA calculation. This could be many-leveled, although FIGS. 5A-5B show two-leveled examples.

In this way, for a media content provider selecting content to include in a playlist, HOWA combines multiple objectives that support user satisfaction (e.g., track affinity, and artist affinity) in a way that is more complex than using simple averaging or weighted sums. For example, a user is satisfied with different media content for different reasons, including, familiarity with the content item, familiarity with the artist, how the media content fits with the other media content that is recently played (e.g., in the rest of the playlist), etc. Thus, it is important to score a user's satisfaction (e.g., affinity) with a media content item that accounts for this plurality of reasons (e.g., objectives).

In FIG. 5A, a first ordered weighted average is applied to a first set of objectives, resulting in a score (e.g., equal to the calculated OWA) for set 1 objectives 512. For example, each objective in the first set of objectives (e.g., objective 502, objective 504, objective 506 and objective 508) has a value. The objectives are ordered by their value (e.g., from largest value to smallest value). For example, objective 502 (e.g., user-satisfaction objective) has a value of 0.8, objective 504 (e.g., noise objective) has a value of 0.3, objective 506 (e.g., track-affinity objective) has a value of 0.9, and objective 508 (e.g., artist-affinity objective) has a value of 0.8. Thus, the order, from greatest value to least value, is: objective 506, objective 502 and objective 508, and objective 504, thus producing an ordered value vector [0.9, 0.8, 0.8, 0.3].

Next, weights are assigned to each objective, based on their order, such that the objective with the largest value also is assigned the first weight (e.g., the largest weight, although that need not be the case), and the objective with the second-to-largest value applies the second weight (e.g., the second-to-largest weight), and so on. For example, where the weight (w), for each position (alternative) i, is calculated using:

$$w_i = Q\left(\frac{i}{n}\right) - Q\left(\frac{i-1}{n}\right)$$

as explained above.

An OWA is then calculated for the first set of objectives (e.g., to produce a score for set 1 objectives 512). For example, OWA_MANY (e.g., an "AND" operator) is applied to the first set of objectives (e.g., objective 502, objective 504, objective 506 and objective 508). A score for set 1 objectives 512 is determined by computing the weighted sum of the OWA weights multiplied by the objective values for the objectives in the first set. Thus, the OWA is calculated by taking the weighted sum of the OWA weights [$w_1$, $w_2$, $w_3$, $w_4$] applied to the value vector [0.9, 0.8, 0.8, 0.3] (e.g., by multiplying each value by its corresponding weight, and then summing the weighted values). By applying an OWA_ANY calculation (e.g., with a high value for α), the resulting OWA (e.g., score) is, for example, 0.89 for the first set of objectives.

As illustrated by this example, each objective in the set is assigned a weight based on its value (e.g., relative to the values of the other objectives), instead of assigning a weight to a particular objective. For example, if the value of an objective is updated (e.g., changed), the order of objectives is also updated, and the weights assigned to each objective is updated accordingly.

The computed score of the first set of objectives (e.g., 0.89) then becomes the value for the first set of objectives when the first set of objectives is used in the second OWA calculation. For example, set 1 objectives 512 (e.g., with a value of 0.89) becomes an objective within objective set 2 (e.g., which also includes additional objectives 510, 514, and 515).

A second ordered weighted average is applied to the second set of objectives to determine combined objectives 516, wherein the second set of objectives includes the result set 1 objectives 512 and additional objectives (e.g., single objectives), including objective 510, objective 514, and objective 515.

The second OWA is then applied to the second set of objectives (e.g., including set 1 objectives 512, objective 510, objective 514, and objective 515). For example, an OWA_ANY ("OR") (e.g., with a low value for a) is calculated for the second set of objectives. To calculate the OWA for the second set of objectives, the objectives in set 2 are now ordered (e.g., from greatest to least), each objective is assigned a weight, and the OWA is calculated by multiplying the respective weight by the respective objective in the second set to output a value (e.g., OWA) of the second set of objectives. For example, set 1 objectives has a value of 0.89 (e.g., as calculated above), objective 510 has a value of 0.1, objective 514 has a value of 0.4, and objective 515 has a value of 0.2. Thus, the ordered value vector, from greatest value to least, comprises: set 1 objectives, objective 514, objective 515, and objective 510, with values [0.89, 0.4, 0.2, 0.1] to be assigned weights [$w_5$, $w_6$, $w_7$, $w_8$]. Because this is an "OWA_ANY" calculation, and at least one objective has a high value, the overall score for combined objectives 516 is also high with a value of 0.82.

Taking the overall score for the combined objectives as 0.82 for this media content item (e.g., a first media content item), this score is then used by the media content provider in considering candidates for inclusion into a playlist. For example, if the first media content item has a score of 0.82, and a second media content item has a score of 0.6, the media content provider select the first media content item over the second media content item (for consideration with respect to the playlist) because it has the larger score.

FIG. 5B illustrates another example of calculating a hierarchical ordered weighted average (HOWA). For example, a score is calculated for set 1 objectives 536 by calculating an ordered weighted average of objective 520, objective 522, objective 524, and objective 526. A score is calculated for set 2 objectives 538 by calculating an ordered weighted average of objective 528, objective 530, objective 532, and objective 534.

Next, at a second level within the hierarchy of ordered weighted averages, the scores for set 1 objectives 536 and set 2 objectives 538 are combined by calculating an OWA of set 1 objectives 536 and set 2 objectives 538. In the second level of the hierarchy, another OWA is calculated by combining the ordered weighted average of set 1 objectives 536 and the ordered weighted average of set 2 objectives 538 (and any other objectives or ordered weighted average of other sets of objectives), to determine a score for combined objectives 540 (e.g., where the score for combined objectives 540 is the OWA that is calculated using the score of set 1 objectives 536 and the score of set 2 objectives 538). Thus, the ordered weighted average is hierarchical because the system calculates an OWA based on the values for set 1 objectives 536 and set 2 objectives 538, where each of those values were also determined by calculating the OWA for the set 1 objectives 536 and calculating the OWA for the set 2 objectives 538.

It will be understood that for any of the OWA calculations described, OWA_MANY or OWA_ANY may be applied depending on the value chosen for the parameter α.

In some embodiments, the objectives include different types of objectives, such as engagement objectives (e.g., user clicks, complete listens, skips), satisfaction objectives (e.g., hearts and hands, percentage streamed), content characteristic objectives (e.g., relevance, user-track genre similarity, artist and genre affinity), and platform objectives (e.g., strategic value of content to platform or artist). These objectives comprise a mix of computed and predicted estimates, with the predicted estimates (e.g., engagement criterion) being the output of sophisticated large-capacity models trained specifically for these tasks.

In some embodiments, a hierarchical ordered weighted average is computed for each media content item in a plurality of media content items. The score that is calculated (e.g., combined objectives 516 or combined objectives 540) for each media content item is then used to rank the media content items in the plurality of media content items. For example, the media content items with the highest scores are ranked highest.

In some embodiments, the media content items with the highest ranking(s) are selected and considered for inclusion into a playlist (e.g., by checking whether the individual candidates meet the constraints for a respective slot in the playlist). In some embodiments, the plurality of media content items are ordered, for playback, according to the combined objective score (e.g., from the largest score to the smallest score). In some embodiments, the combined objective score for each media content item in the plurality of media content items is calculated using a same hierarchical ordered weighted average structure (e.g., a first OWA calculated using OWA_ANY and a second OWA calculated using OWA_MANY).

Figure 6:
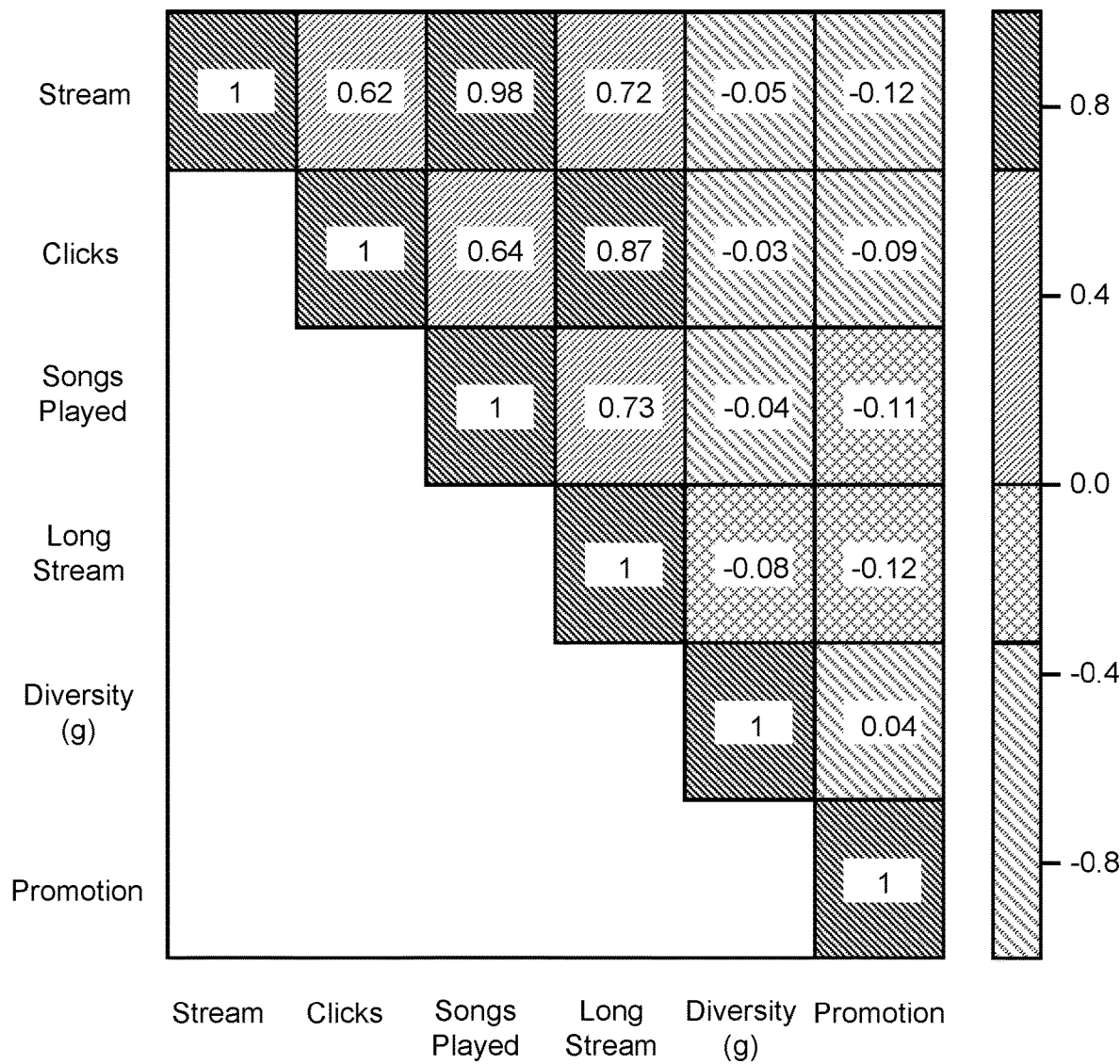
FIG. 6 is a chart illustrating trade-offs between a plurality of objectives, in accordance with some embodiments.

FIG. 6 is a chart illustrating trade-offs between a plurality of objectives, in accordance with some embodiments. In some embodiments, the different objectives correspond to different parties. As illustrated in FIG. 6, in some embodiments, respective objectives are conflicting (e.g., represented by a negative correlation), while other respective objectives are aligned (e.g., represented by a positive correlation, with the greatest alignment having a value of 1). In some embodiments, a system for providing automatically generated playlists balances objectives to maximize the overall satisfaction among the different parties. In some embodiments, the automatically generated playlist comprises a list of media content items. Thus, the system recommends a list of media content items that will provide the overall greatest satisfaction (e.g., by balancing the multiple objectives from multiple parties).

In some embodiments, the multiple parties comprise one or more of: a user, a media content provider, and an advertiser. Each of the multiple parties has one or more objectives. For example, as illustrated in FIG. 6, each axis includes a plurality of user objectives (e.g., user engagement metrics) and a plurality of objectives for a non-user (e.g., a third party). For example, the non-user comprises a stakeholder. For example, the non-user objectives comprise "diversity (g)" (e.g., representing gender diversity (of artists) present in the recommended set) and "promotion" (e.g., promotion of a particular artist and/or type of media content), while "stream" (e.g., duration of streamed media content), "clicks" (e.g., selections of playlists), "songs played" (e.g., number of media content items played), and long stream are user objectives. It should be understood that the objectives illustrated in FIG. 6 are merely examples of possible objectives. For example, in some embodiments, other types of diversity objectives (such as an objective to represent artists with a smaller following, in addition to big-name artists). In some embodiments, a diversity objective can be applied to any attribute of the media content items (e.g., which may be specified as metadata for the media content item).

In some embodiments, user objectives are determined based on previous interactions between the user and the media content provider. For example, the media content provider tracks and/or stores (e.g., in a playback history) actions (e.g., selections) made by the user. In some embodiments, the user interaction information comprises a number of clicks (e.g., a number of times a media content item is selected), a number of streams, a number of content items played (e.g., a length of a playback session), or other user engagement metrics. In some embodiments, the media content provider stores a plurality of user engagement metrics. In some embodiments, the plurality of user engagement metrics are correlated (or uncorrelated).

For example, FIG. 6 illustrates that the user objectives tend to be positively correlated with each other, while the non-user objectives are negatively correlated with the user objectives, indicating that optimizing the selection model based on the user objectives alone does not satisfy the non-user objectives (and vice-versa). Thus, there is a trade-off between optimizing a model for user objectives or optimizing the model for non-user objectives.

Figure 7A:
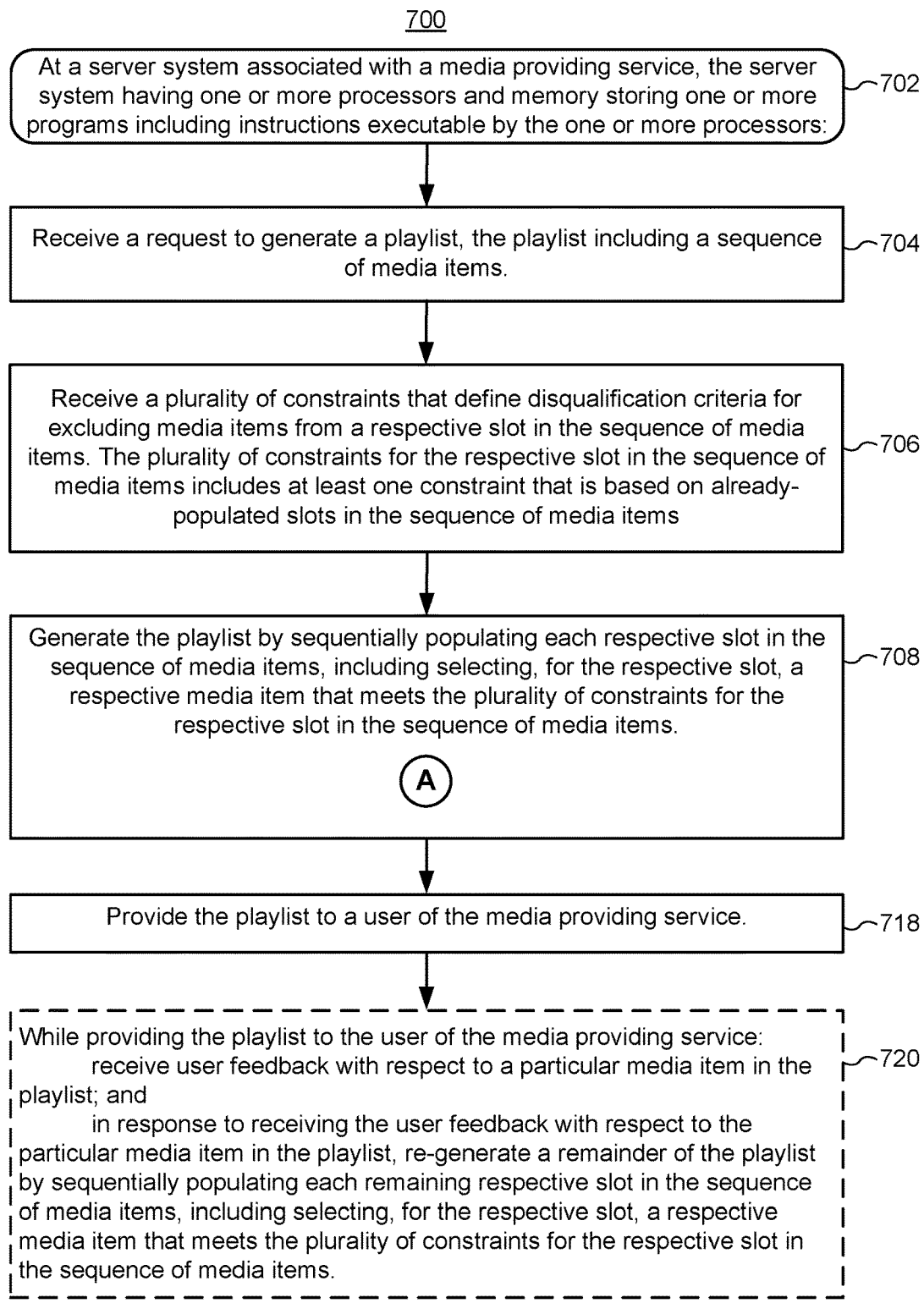
Figure 7B:
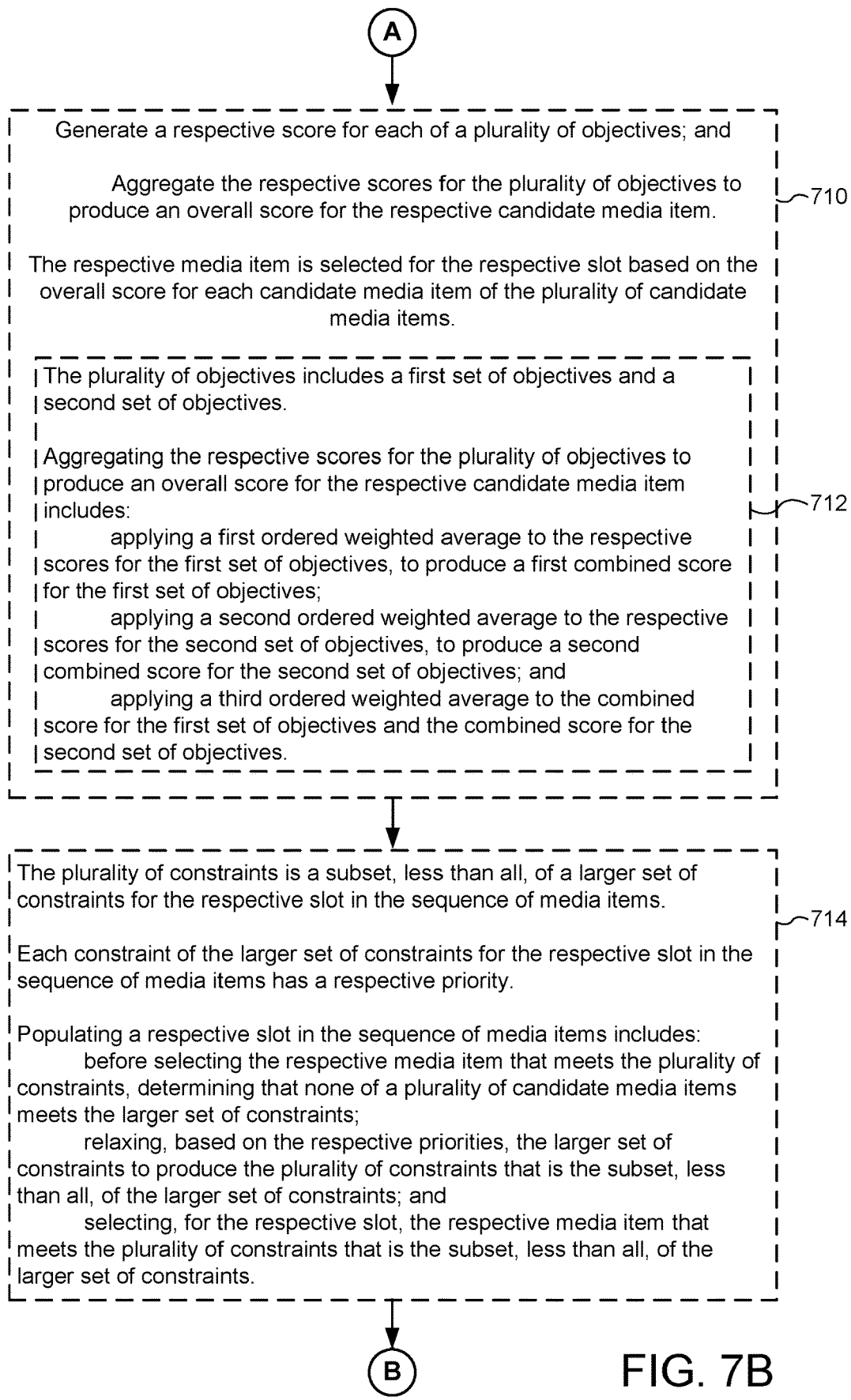

FIGS. 7A-7C are flow diagrams illustrating a method of sequencing a playlist of media items, in accordance with some embodiments. Method 700 may be performed (702) at a server system associated with a media providing service. The server system has one or more processors and memory storing one or more programs including instructions executable by the one or more processors. In some embodiments, the method 700 is performed by executing instructions stored in the memory (e.g., memory 306, FIG. 3) of the server system (e.g., media content server 104). In some embodiments, the method 700 is performed by a combination of the server system (e.g., including media content server 104 and CDN 106) and an electronic device (e.g., electronic device 102, FIG. 2). In some embodiments, the server system provides tracks (e.g., media items) for playback to the electronic device(s) 102 of the media content delivery system 100.

The method includes receiving (704) a request to generate a playlist. The playlist includes a sequence of media items (e.g., once the generating operation 708 is complete, the playlist includes the sequence of media items). In some embodiments, the playlist is an automatically generated playlist (e.g., the playlist is generated without the user selecting individual media items). In some embodiments, the media items include audio media items (e.g., songs, spoken word), video media items (which typically include audio) or a combination of audio and video media items. In some embodiments, the request to generate a playlist is received in response to a user selecting the playlist in a media application (e.g., media application 222, FIG. 2). For example, in some embodiments, the playlist is generated in response to the user selecting a "My Daily Hits" playlist on their device. In some embodiments, the playlist is generated on a predetermined schedule (e.g., the "My Daily Hits" playlist is updated daily, at midnight). In some embodiments, the playlist is a personalized playlist for a particular user.

The method includes receiving (706) a plurality of constraints that define disqualification criteria for excluding media items from a respective slot in the sequence of media items (e.g., the server system receives, from a developer, list of constraints 422, FIG. 4B). Note that the list of constraints may be received before or after the request to generate the playlist, although it is typically received before. The plurality of constraints for the respective slot in the sequence of media items includes at least one constraint that is based on already-populated slots in the sequence of media items. In some embodiments, the at least one constraint is based at least in part on the state of the playlist that has been generated so far (e.g., the constraint is based on the sequencer state 404, FIG. 4A). That is to say, in some embodiments, the already-populated slots are fed back into the constraints, so that the next slot is filled with a media item that meets the constraints given the already-populated slots. Examples of such constraints include a constraint that two media items by the same artist should not be placed within a predefined number of slots of one another (e.g., within 5 slots of one another), or that the style of adjacent media items (e.g., tempo) should not differ by more than a predefined amount.

In some embodiments, the plurality of constraints includes at least one constraint that is independent of the already-populated slots in the sequence of media items (e.g., a global constraint). Examples of global constraints include those described with reference to FIG. 4B.

The method includes generating (708) the playlist by sequentially populating each respective slot in the sequence of media items, including selecting, for the respective slot, a respective media item that meets the plurality of constraints for the respective slot in the sequence of media items. In some embodiments, the plurality of candidate media items consists of media items that meet the plurality of constraints for the respective slot in the sequence of media items. Stated another way, the server system populates the playlist by going slot-by-slot, starting with the first slot, and ensuring that each subsequent slot meets the constraints given the already-populated playlist (or at least meets the relaxed constraints, as described in more detail below). This process is also further described with reference to FIG. 4A.

In some embodiments, generating the playlist by sequentially populating each respective slot in the sequence of media items further includes (710), for each respective slot in the sequence of media items: for each respective candidate media item of a plurality of candidate media items: generating a respective score for each of a plurality of objectives; and aggregating the respective scores for the plurality of objectives to produce an overall score for the respective candidate media item. The respective media item is selected for the respective slot based on the overall score for each candidate media item of the plurality of candidate media items (e.g., by selecting the media item with the highest aggregate score, or randomly selecting a media item from the ten media items with the highest scores).

In some embodiments, the plurality of objectives for the sequence of media items includes at least one objective having a corresponding score that is based on already-populated slots in the sequence of media items. In some embodiments, the score for the at least one objective is based at least in part on the state of the playlist that has been generated so far (e.g., sequencer state 404, FIG. 4A). For example, in some embodiments, the plurality of objectives includes an objective to provide a playlist with a high degree of gender diversity.

In some embodiments, the constraints are applied before scoring the candidate media items (e.g., the server system determines which candidates meet the constraints, then scores all of the candidates that meet the constraints and selects one of the candidates that meets the constraints using a selection strategy based on the scores).

In some embodiments, the constraints are applied after scoring the candidate media items. In some embodiments, the operation of selecting, for the respective slot, the respective media item that meets the plurality of constraints for the respective slot in the sequence of media items is performed after producing the overall score for each respective candidate media item of the plurality of candidate media items (e.g., all of the candidates are scored, then a particular candidate is selected based on the scores, and that particular candidate is tested against the criteria, as shown in the loop between reference numbers 410 and 412 in FIG. 4A).

In some embodiments, the scores for the various objectives are aggregated using a weighted average. In some embodiments, the scores for the various objectives are aggregated using an ordered weighted average (e.g., a hierarchical ordered weighted average as described with reference to FIGS. 5A-5B). To that end, in some embodiments, the plurality of objectives includes (712) a first set of objectives and a second set of objectives. Aggregating the respective scores for the plurality of objectives to produce an overall score for the respective candidate media item includes: applying a first ordered weighted average to the respective scores for the first set of objectives, to produce a first combined score for the first set of objectives; applying a second ordered weighted average to the respective scores for the second set of objectives, to produce a second combined score for the second set of objectives; and applying a third ordered weighted average to the combined score for the first set of objectives and the combined score for the second set of objectives.

In some embodiments, the plurality of objectives includes at least one artist-based objective (e.g., a promotion objective, wherein the objective produces higher objective-specific scores for artists that are being promoted).

In some embodiments, the plurality of objectives includes at least one listener objective. In some embodiments, the at least one listener objective is a predicted objective (e.g., an objective for which a value is calculated by predicting a user interaction, e.g., based on the user's listening history) Examples of such objectives include an objective that the user will maintain the listening session for a long time, or play a large number of tracks, or click to "like" the tracks).

In some embodiments, the plurality of constraints is (714) a subset, less than all, of a larger set of constraints for the respective slot in the sequence of media items. Each constraint of the larger set of constraints for the respective slot in the sequence of media items has a respective priority. Populating a respective slot in the sequence of media items includes: before selecting the respective media item that meets the plurality of constraints, determining that none of a plurality of candidate media items meets the larger set of constraints; relaxing, based on the respective priorities, the larger set of constraints to produce the plurality of constraints that is the subset, less than all, of the larger set of constraints (e.g., as described in FIG. 4B); and selecting, for the respective slot, the respective media item that meets the plurality of constraints that is the subset, less than all, of the larger set of constraints.

In some embodiments, the larger set of constraints includes (716) multiple constraints that are independent of the already-populated slots in the sequence of media items. The method includes prior to generating the playlist by sequentially populating each respective slot in the sequence of media items, generating a table that includes information indicating the priority at which each of the plurality of candidate media items is disqualified from each respective slot in the sequence of media items (e.g., disqualification table 420, FIG. 4B). Relaxing, based on the respective priorities, the larger set of constraints to produce the plurality of constraints that is the subset, less than all, of the larger set of constraints includes referring to the table.

In some embodiments, the method includes, prior to receiving the request to generate the playlist, receiving an ordered list of the larger set of constraints. The constraints in the ordered list of the larger set of constraints are ordered according to priority. In some embodiments, the method includes populating a next respective slot in the sequence of media items, immediately following the respective slot, by applying the larger set of constraints. Stated another way, in some embodiments, the constraints are relaxed, as necessary, on a slot-by-slot basis. Once a slot is filled, the full set of constraints is used for the next slot (and again relaxed, as necessary), since constraints that are not met for one slot may be met for the next slot.

In some embodiments, the method includes: prior to generating the playlist by sequentially populating each respective slot in the sequence of media items, filtering an initial set of candidate media items using the at least one constraint that is independent of the already-populated slots in the sequence of media items to produce a filtered set of candidate items. Selecting, for each respective slot, a respective media item that meets the plurality of constraints for the respective slot in the sequence of media items includes selecting the respective media item from the filtered set of candidate items. In some embodiments, the filtering is based on the user's listening history (e.g., the full repository of candidate items is filtered down to 2000 tracks that are most similar to tracks that the user has listened to). In some embodiments, the filtering is based on genre or other metadata associated with the set of candidate items. For example, in response to a determination that a user tends to listen to folk music, the server system suggests a "Daily Folk" playlist, and thus the repository of candidate items is initially filtered such that media items with a folk genre are considered for the playlist. In some embodiments, the at least one constraint that is independent of the already-populated slots in the sequence of media items includes a constraint based on the user's listening session. For example, in some embodiments, the filtering includes removing media content items that the user has listened to within a predetermined amount of time (e.g., 60 minutes, 120 minutes, 180 minutes, or since the user opened the application and began streaming media).

The method includes providing (718) the playlist to a user of the media providing service. In some embodiments, providing the playlist to the user comprises providing URLs to the user's device (e.g., an electronic device 102) from which the user's device can obtain the media items in the playlist. In some embodiments, providing the playlist to the user comprises providing information to the user's device with which to display the playlist (e.g., in media application 222). In some embodiments, providing the playlist to the user comprises streaming the media items in the playlist to the user's device. In some embodiments, the user may select a presentation device distinct from the user's device (e.g., a speaker system) and providing the playlist to the user comprises streaming the media items in the playlist to the presentation device.

In some embodiments, the method includes while providing the playlist to the user of the media providing service: receiving (720) user feedback with respect to a particular media item in the playlist; and in response to receiving the user feedback with respect to the particular media item in the playlist, re-generating a remainder of the playlist by sequentially populating each remaining respective slot in the sequence of media items, including selecting, for the respective slot, a respective media item that meets the plurality of constraints for the respective slot in the sequence of media items. Stated another way, in some embodiments, the server system re-generates the remainder of the playlist in response to a user action with respect to the playlist (e.g., a skip, a "like") as such user actions may change scores for the objectives used to populate the playlist.

The foregoing description, for purposes of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a server system associated with a media providing service, the server system having one or more processors and memory storing one or more programs including instructions executable by the one or more processors:
receiving a request to generate a playlist, the playlist including a sequence of media items;
receiving a plurality of constraints that define disqualification criteria for excluding media items from a respective slot in the sequence of media items, wherein:
the plurality of constraints for the respective slot in the sequence of media items includes at least one constraint that is based on an order of already-populated media items in the respective slots in the sequence of media items; and
the plurality of constraints is a subset, less than all, of a larger set of constraints for the respective slot in the sequence of media items, the larger set of constraints including multiple constraints that are independent of the already-populated media items in the respective slots in the sequence of media items;
generating the playlist by sequentially populating each respective slot in the sequence of media items, including, for a respective slot:
for each respective candidate media item of a plurality of candidate media items:
generating a respective score for each of a plurality of objectives; and
aggregating the respective scores for the plurality of objectives to produce an overall score for the respective candidate media item;
determining that none of the plurality of candidate media items meets the larger set of constraints;
in accordance with the determination that none of the plurality of candidate media items meets the larger set of constraints:
relaxing, for the respective slot, the larger set of constraints to produce the plurality of constraints that is the subset, less than all, of the larger set of constraints; and
selecting, for the respective slot, a respective media item from the plurality of candidate media items that meets the plurality of constraints for the respective slot in the sequence of media items and based on the overall score for each candidate media item of the plurality of candidate media items; and
providing the playlist to a user of the media providing service.

2. The method of claim 1, wherein:
each constraint of the larger set of constraints for the respective slot in the sequence of media items has a respective priority; and
relaxing the larger set of constraints to produce the plurality of constraints that is the subset, less than all, of the larger set of constraints includes relaxing, based on the respective priorities, the larger set of constraints.

3. The method of claim 2, wherein:
the method further includes, prior to generating the playlist by sequentially populating each respective slot in the sequence of media items, generating a table that includes information indicating the priority at which each of the plurality of candidate media items is disqualified from each respective slot in the sequence of media items; and
relaxing, based on the respective priorities, the larger set of constraints to produce the plurality of constraints that is the subset, less than all, of the larger set of constraints includes referring to the table.

4. The method of claim 2, further including:
prior to receiving the request to generate the playlist, receiving an ordered list of the larger set of constraints, wherein the constraints in the ordered list of the larger set of constraints are ordered according to priority.

5. The method of claim 4, further including:
populating a next respective slot in the sequence of media items, immediately following the respective slot, by applying the larger set of constraints.

6. The method of claim 1, wherein the plurality of constraints includes at least one constraint that is independent of the already-populated media items in the respective slots in the sequence of media items.

7. The method of claim 6, further including:
prior to generating the playlist by sequentially populating each respective slot in the sequence of media items, filtering the plurality of candidate media items using the at least one constraint that is independent of the already-populated media items in the respective slots in the sequence of media items to produce a filtered set of candidate media items,
wherein selecting, for each respective slot, a respective media item that meets the plurality of constraints for the respective slot in the sequence of media items includes selecting the respective media item from the filtered set of candidate media items.

8. The method of claim 1, wherein the plurality of objectives for the sequence of media items includes at least one objective having a corresponding score that is based on already-populated slots in the sequence of media items.

9. The method of claim 1, wherein the plurality of candidate media items consists of media items that meet the plurality of constraints for the respective slot in the sequence of media items.

10. The method of claim 1, wherein the operation of selecting, for the respective slot, the respective media item that meets the plurality of constraints for the respective slot in the sequence of media items is performed after producing the overall score for each respective candidate media item of the plurality of candidate media items.

11. The method of claim 1, wherein:
the plurality of objectives includes a first set of objectives and a second set of objectives; and
aggregating the respective scores for the plurality of objectives to produce an overall score for the respective candidate media item includes:
applying a first ordered weighted average to the respective scores for the first set of objectives, to produce a first combined score for the first set of objectives;
applying a second ordered weighted average to the respective scores for the second set of objectives, to produce a second combined score for the second set of objectives; and
applying a third ordered weighted average to the combined score for the first set of objectives and the combined score for the second set of objectives.

12. The method of claim 1, wherein the plurality of objectives includes at least one artist-based objective.

13. The method of claim 1, wherein the plurality of objectives includes at least one listener objective.

14. The method of claim 1, further comprising:
while providing the playlist to the user of the media providing service:
receiving user feedback with respect to a particular media item in the playlist; and
in response to receiving the user feedback with respect to the particular media item in the playlist, re-generating a remainder of the playlist by sequentially populating each remaining respective slot in the sequence of media items, including selecting, for the respective slot, a respective media item that meets the plurality of constraints for the respective slot in the sequence of media items.

15. The method of claim 1, wherein:
a first objective of the plurality of objectives is negatively correlated with a second objective of the plurality of objectives; and
the first objective of the plurality of objectives is positively correlated with a third objective of the plurality of objectives, wherein the third objective is distinct from the second objective.

16. A server system associated with a media providing service, comprising:
one or more processors; and
memory storing one or more programs including instructions for:
receiving a request to generate a playlist, the playlist including a sequence of media items;
receiving a plurality of constraints that define disqualification criteria for excluding media items from a respective slot in the sequence of media items, wherein:
the plurality of constraints for the respective slot in the sequence of media items includes at least one constraint that is based on an order of already-populated media items in the respective slots in the sequence of media items; and
the plurality of constraints is a subset, less than all, of a larger set of constraints for the respective slot in the sequence of media items, the larger set of constraints including multiple constraints that are independent of the already-populated media items in the respective slots in the sequence of media items;
generating the playlist by sequentially populating each respective slot in the sequence of media items, including, for a respective slot:
for each respective candidate media item of a plurality of candidate media items:
generating a respective score for each of a plurality of objectives; and
aggregating the respective scores for the plurality of objectives to produce an overall score for the respective candidate media item;
determining that none of the plurality of candidate media items meets the larger set of constraints;
in accordance with the determination that none of the plurality of candidate media items meets the larger set of constraints:
relaxing, for the respective slot, the larger set of constraints to produce the plurality of constraints that is the subset, less than all, of the larger set of constraints; and
selecting, for the respective slot, a respective media item from the plurality of candidate media items that meets the plurality of constraints for the respective slot in the sequence of media items and based on the overall score for each candidate media item of the plurality of candidate media items; and
providing the playlist to a user of the media providing service.

17. The server system of claim 16, wherein:
each constraint of the larger set of constraints for the respective slot in the sequence of media items has a respective priority; and
relaxing the larger set of constraints to produce the plurality of constraints that is the subset, less than all, of the larger set of constraints includes relaxing, based on the respective priorities, the larger set of constraints.

18. The server system of claim 17, wherein:
the one or more programs further include instructions for, prior to generating the playlist by sequentially populating each respective slot in the sequence of media items, generating a table that includes information indicating the priority at which each of the plurality of candidate media items is disqualified from each respective slot in the sequence of media items; and
relaxing, based on the respective priorities, the larger set of constraints to produce the plurality of constraints that is the subset, less than all, of the larger set of constraints includes referring to the table.

19. The server system of claim 17, wherein the one or more programs further include instructions for:
prior to receiving the request to generate the playlist, receiving an ordered list of the larger set of constraints, wherein the constraints in the ordered list of the larger set of constraints are ordered according to priority.

20. A non-transitory computer-readable storage medium storing instructions, which, when executed by a server system associated with a media providing service, cause the server system to perform a set of operations, including:
receiving a request to generate a playlist, the playlist including a sequence of media items;
receiving a plurality of constraints that define disqualification criteria for excluding media items from a respective slot in the sequence of media items, wherein:
the plurality of constraints for the respective slot in the sequence of media items includes at least one constraint that is based on an order of already-populated media items in the respective slots in the sequence of media items; and
the plurality of constraints is a subset, less than all, of a larger set of constraints for the respective slot in the sequence of media items, the larger set of constraints including multiple constraints that are independent of the already-populated media items in the respective slots in the sequence of media items;
generating the playlist by sequentially populating each respective slot in the sequence of media items, including, for a respective slot:
for each respective candidate media item of a plurality of candidate media items:
generating a respective score for each of a plurality of objectives; and
aggregating the respective scores for the plurality of objectives to produce an overall score for the respective candidate media item;
determining that none of the plurality of candidate media items meets the larger set of constraints;
in accordance with the determination that none of the plurality of candidate media items meets the larger set of constraints:
relaxing, for the respective slot, the larger set of constraints to produce the plurality of constraints that is the subset, less than all, of the larger set of constraints; and
selecting, for the respective slot, a respective media item from the plurality of candidate media items that meets the plurality of constraints for the respective slot in the sequence of media items and based on the overall score for each candidate media item of the plurality of candidate media items; and
providing the playlist to a user of the media providing service.

* * * * *